United States Patent
Maiworm et al.

(10) Patent No.: US 12,281,281 B2
(45) Date of Patent: Apr. 22, 2025

(54) EDIBLE OIL REFINING

(71) Applicant: Cargill, Incorporated, Wayzata, MN (US)

(72) Inventors: Michael Maiworm, Hamburg (DE); Armin Willem-Friedrich Hermann Tarnow, Rotterdam (NE)

(73) Assignee: Cargill, Incorporated, Wayzata, MN (US)

( * ) Notice: Subject to any disclaimer, the term of this patent is extended or adjusted under 35 U.S.C. 154(b) by 1096 days.

(21) Appl. No.: 16/968,051

(22) PCT Filed: Feb. 21, 2019

(86) PCT No.: PCT/US2019/018944
§ 371 (c)(1),
(2) Date: Aug. 6, 2020

(87) PCT Pub. No.: WO2019/165065
PCT Pub. Date: Aug. 29, 2019

(65) Prior Publication Data
US 2021/0071103 A1  Mar. 11, 2021

(30) Foreign Application Priority Data

Feb. 21, 2018 (EP) ..................................... 18157904
Jul. 18, 2018 (EP) ..................................... 18184132

(51) Int. Cl.
*C11B 3/14* (2006.01)
*B01D 3/00* (2006.01)
*B01D 3/16* (2006.01)
*B01D 19/00* (2006.01)

(52) U.S. Cl.
CPC ................ *C11B 3/14* (2013.01); *B01D 3/009* (2013.01); *B01D 3/16* (2013.01); *B01D 19/0015* (2013.01); *B01D 2257/708* (2013.01)

(58) Field of Classification Search
CPC .. C11B 3/14; B01D 3/009; B01D 3/16; B01D 19/0015; B01D 2257/708
See application file for complete search history.

(56) References Cited

U.S. PATENT DOCUMENTS

| | | | |
|---|---|---|---|
| 4,378,317 A | 3/1983 | Seguine | |
| 7,718,698 B2 | 5/2010 | Breivik | |
| 7,892,335 B2 | 2/2011 | Kellens | |
| 9,114,329 B2 | 8/2015 | Galina | |
| 10,150,053 B2 | 12/2018 | Sarup | |
| 2005/0256326 A1 | 11/2005 | Breivik | |
| 2008/0081097 A1 | 4/2008 | Kellens | |
| 2012/0245372 A1 | 9/2012 | Galina | |
| 2012/0289726 A1* | 11/2012 | Josten | .................. C07C 29/149 |
| | | | 554/170 |

FOREIGN PATENT DOCUMENTS

| | | | | |
|---|---|---|---|---|
| CN | 1242409 A | * | 1/2000 | |
| CN | 102470284 B | | 10/2016 | |
| CN | 206721116 U | | 12/2017 | |
| CN | 105121615 B | | 4/2018 | |
| CN | 104981538 B | | 5/2021 | |
| EP | 0866843 A1 | | 9/1998 | |
| EP | 1905815 A1 | * | 4/2008 | ............. C02F 1/006 |
| EP | 1905816 A1 | | 4/2008 | |
| EP | 3321348 A1 | | 5/2018 | |
| EP | 3330609 A1 | | 6/2018 | |
| GB | 816522 A | | 7/1959 | |
| WO | 2004007654 W | | 1/2004 | |
| WO | 2011019315 W | | 2/2011 | |
| WO | 2012107230 A1 | | 8/2012 | |
| WO | 2014033664 W | | 3/2014 | |
| WO | WO-2014033664 A2 | * | 3/2014 | ............. B01D 3/02 |
| WO | 2019165071 A1 | | 8/2019 | |

OTHER PUBLICATIONS

"Editable Lipid Processing Technology", He Dongping, HuBei Science & Technology Press, 1st Edition, Dec. 2010, pp. 124-125.
"Food Biochemistry", Hong QingCi, Nanjing University Press, 1st Edition, May 2000, pp. 84-85.
Loft S C Ed—Koseoglu Semih Sefa et al.: Deodorization—Theory and Practice, Jan. 1, 1989, Advances in Oils and Fats, Antioxidants, and Oilseed By-Prod, Champaign, Ill. : AOCS Press US, pp. 117-122, XP008134203.
Golovanchikov A.B., Prokhorenko N.A., Karev V.N. "Algorithm for calculating the packed distillation column with allowance for longitudinal mixing in the liquid phase", Izvestya VolgGTU, 2016, pp. 14 to 17.

* cited by examiner

*Primary Examiner* — Deborah D Carr

(57) ABSTRACT

The present invention relates to an oil refining equipment comprising a stripping column with packing and the column has a height to diameter ratio from 0.1 to 10, from 0.5 to 5, from 1 to 4.9, from 1.4 to 4.5, from 1.6 to 2.8. It is used for degrading, decomposing or breaking down oxidation products of triglycerides, diglycerides, monoglycerides and/or fatty acids. A process for refining edible oils is described as well.

16 Claims, No Drawings

EDIBLE OIL REFINING

CROSS REFERENCE TO RELATED APPLICATIONS

This application is a national phase application of PCT/US2019/018944, filed 21 Feb. 2019, entitled EDIBLE OIL REFINING, which claims the benefit of priority to European Provisional Application No. 18157904.6, filed 21 Feb. 2018, entitled EDIBLE OIL REFINING and European Provisional Application No. 18184132.1, filed 18 Jul. 2018, entitled EDIBLE OIL REFINING, which are hereby incorporated by reference in their entirety.

FIELD OF THE INVENTION

An oil refining equipment comprising a packed stripping column, and its use to refine edible oils.

BACKGROUND OF THE INVENTION

Crude oils, as extracted from their original source, are often not suitable for human consumption due to the presence of high levels of contaminants, which may be either toxic or may cause an undesirable color, odor or taste. Crude oils are typically therefore refined before use. The refining process typically consists of the following major steps: degumming and/or alkali refining, bleaching and deodorizing. An oil obtained after completion of the refining process (called a "NBD" or "RBD oil") is normally considered suitable for human consumption and may therefore be used in the production of any number of foods and beverages.

Furthermore, it is known that the refining process itself may contribute to the introduction of certain contaminants in the refined oil.

Therefore, there is still a need for improving the refining process of oils or fats and providing a suitable equipment for the refining process.

The current invention provides such an equipment, its use and the corresponding process.

SUMMARY OF THE INVENTION

The current invention relates to an oil refining equipment comprising a stripping column with packing characterized in that
a) The packing is having a specific surface of from 100 to 750 $m^2/m^3$, from 100 to 500 $m^2/m^3$, from 150 to 250 $m^2/m^3$,
b) The column has at least an entry for a stripping agent, and/or for the oil,
c) The column has a height to diameter ratio from 0.1 to 10, from 0.5 to 5, from 1 to 4.9, from 1.4 to 4.5, from 1.6 to 2.8.

It further relates to the use of the oil refining equipment of the present invention for degrading, decomposing or breaking down oxidation products of triglycerides, diglycerides, monoglycerides and/or fatty acids.

It further relates to a process for deodorizing an oil in the oil refining equipment of the present invention and the process is comprising the following steps:
a) Passing an oil through the stripping column at a temperature of from 170 to 220° C., from 180 to 220° C., from 190 to 210° C., from 195 to 200° C.,
b) Applying stripping agent to the flow of the oil, and contacting the oil with the stripping agent,
c) Removing volatiles from the oil,
d) Collecting the deodorized oil.

DETAILED DESCRIPTION

The current invention relates to an oil refining equipment comprising a stripping column with packing characterized in that
a) The packing is having a specific surface of from 100 to 750 $m^2/m^3$, from 100 to 500 $m^2/m^3$, from 150 to 250 $m^2/m^3$,
b) The column has at least one entry for a stripping agent, and/or for the oil,
c) The column has a height to diameter ratio from 0.1 to 10, from 0.5 to 5, from 1 to 4.9, from 1.4 to 4.5, from 1.6 to 2.8.

Preferably, the oil refining equipment is an oil refining equipment for edible oils.

It has been found that the height to diameter ratio is from 0.1 to 10, from 0.5 to 5, from 1 to 4.9, from 1.4 to 4.7, from 1.4 to 4.5, from 1.5 to 4.4, from 1.5 to 4.3, from 1.5 to 4.2, from 1.6 to 4.0, from 1.6 to 3.0, from 1.7 to 2.8. Height to diameter ratios of 1.1, 1.2, 1.3, 1.8, 1.9, 2.0, 2.1, 2.2, 2.3, 2.4, 2.5, 2.6, 2.7, 2.9, 3.1, 3.2, 3.4, 3.5, 3.6, 3.7, 4.1 are likewise applicable. Alternatively, height to diameter ratios of 6, 7, 8 and 9 can be applied.

In one aspect of the invention, the height to diameter ratio is from 0.1 to 10, from 0.5 to 5, from 1 to 4.9, from 1.4 to 4.7, from 1.4 to 4.5, from 1.5 to 4.4, from 1.5 to 4.3, from 1.5 to 4.2, from 1.6 to 4.0, from 1.6 to 3.0, from 1.7 to 2.8 with the proviso that the height is not 1 meter while the diameter is 200 millimeters.

The packing can be random packing or structured packing. Preferably the packing is a structured packing.

The term structured packing is well-known in the technical field and it refers to a range of specially designed materials for use in absorption and distillation columns. Structured packings typically consist of thin corrugated metal plates arranged in a way that force fluids to take complicated paths through the column and thereby creating a large surface.

The packing in the equipment of the present invention is having a specific surface of from 100 to 750 $m^2/m^3$, from 100 to 500 $m^2/m^3$, from 150 to 400 $m^2/m^3$, from 150 to 300 $m^2/m^3$, from 200 to 250 $m^2/m^3$.

The "at least one entry for a stripping agent, and/or for the oil" is placed on the column such that a co-current or counter current flow of stripping agent and oil can be obtained. Preferably the entry of the stripping agent is such that a counter current flow of the oil is feasible. In one aspect of the invention, the entry of the stripping agent is at the bottom or near the bottom of the stripping column.

Furthermore, the column has an oil loading of from 0.5 to 3.5 $kg/m^2$ h surface of packing, from 0.6 to 3.4 $kg/m^2$ h surface of packing, from 0.7 to 3.3 $kg/m^2$ h, from 0.8 to 3.2 $kg/m^2$ h, from 0.9 to 3.1 $kg/m^2$ h, from 1.0 to 3.0 $kg/m^2$ h, from 1.5 to 2.8 $kg/m^2$ h, from 2.0 to 2.5 $kg/m^2$ h, preferably from 1.0 to 3.0 $kg/m^2$ h. An oil loading of 1.6, 2.2, 2.3, 2.4 or 2.5 $kg/m^2$ h surface of packing is likewise applicable.

In a further aspect of the invention, the current equipment allows for a residence time, more in particular a residence time in the stripping packing of from 1 to 10 minutes, from 1 to 9 minutes, from 2 to 8 minutes, from 3 to 7 minutes, from 4 to 6 minutes, from 1 to 5 minutes, from 1 to 3 minutes. Residence times of 3.2, 3.5 or 4.7 minutes are likewise applicable. It is possible to allow for a suitable and short residence time with a low load of oil (expressed as $kg/m^2$ h surface of packing) on the packing. A skilled person understands that residence time is affected by the type of packing, loading of oil, and dimensions of the column. Residence time can be increased or decreased by modifying one or more of these factors.

Furthermore, the present invention relates to the equipment which is further comprising not more than one oil collection tray. The equipment of the present invention is not containing further retention trays.

The "not more than one" oil collection tray is a range covering "up to one" collection tray, and thus including also no collection tray.

In an aspect of the present invention where one collection tray is present, it is meant to collect the oil that drops down from the packing by gravity and make it available for pumps that transport the oil. No process and/or quality changes are performed in the collection tray. The only purpose of the collection tray is a collection and/or accumulation of oil for hold-up purposes. There are no chemical and/or physical changes in the quality of the oil while residing in the collection tray. A refining equipment with no collection tray is suitable as well. In absence of a collection tray, the oil will be directly transported without collection in the refining equipment. The oil is cooled down by applying a heat exchanger. There is no mixing of the oil with a quenching oil.

The equipment of the present invention is not containing retention trays. Retention trays, retention vessels, or compartments, also known as sections, are always present in standard deodorizer equipment known in the art, whether batch, continuous or semi-continuous deodorizer equipment. Batch, continuous or semi-continuous deodorizers are built of these different compartments, the retention trays. In each tray the oil is kept for a certain time at high temperature and steam is introduced into the oil. Long retention time of the oil is needed to obtain physical and chemical changes in the oil, obtained by forcing the oil from one tray to the next tray. Components such as amongst others, colour, flavour and/or flavour precursors are decomposed into volatile breakdown products which are then removed by steam passing through the oil in the retention trays. In order to obtain oils of acceptable to good quality, long retention (residence) times are required. However, these long residence times at high temperatures are known to be responsible for the formation of further unwanted process contaminants, such as chloropropanol esters (3-MCPD esters), glycidyl esters, trans fatty acids, and the like. Additionally, components present in the oil and which are known to be beneficial for the oxidation stability of the oil may be decomposed and the content of these components such as tocopherols, tocotrienols, and the like may be significantly reduced. These are amongst others good reasons to avoid long retention times at high temperatures.

Furthermore, these retention trays may add to the complexity of the known-in the art deodorizers and thus resulting in high investment costs. The retention trays retain high volumes of the oil in the equipment. Keeping such high volumes of oil at high temperature for a long time also may represent a significant energy cost. Switching from one to another edible oil is complicated and the risk of comingling is increased.

In one aspect of the invention, the oil refining equipment is consisting of a stripping column with packing and not more than one oil collection tray and characterized in that
  a) The packing is having a specific surface of from 100 to 750 $m^2/m^3$, from 100 to 500 $m^2/m^3$, from 150 to 250 $m^2/m^3$,
  b) The column has at least one entry for a stripping agent, and/or for the oil,
  c) The column has a height to diameter ratio from 0.1 to 10, from 0.5 to 5, from 1 to 4.9, from 1.4 to 4.5, from 1.6 to 2.8.

In case the "refining equipment is consisting of a stripping column with packing and not more than one oil collection tray" it indicates that the refining ability of the refining equipment is obtained from the use of the stripping column and not more than one oil collection tray. It is to be understood that in order to operate the refining equipment, valves, pumps, heat exchangers and the like will be needed. A heater may be used before the stripping column.

The stripping agent is steam or any other stripping gas, such as nitrogen gas. Preferably steam is used as stripping agent.

The equipment is operated at an absolute pressure of from 0.5 to 10 mbar, from 1 to 9 mbar, 2 to 8 mbar, 3 to 8 mbar, 5 to 8 mbar.

The equipment of the present invention is operated at a temperature of from 170 to 220° C., from 180 to 220° C., from 190 to 210° C., from 195 to 200° C., from 198 to 215° C.

It is to be understood that the equipment of the current invention is suitable to refine oils derived from any type, source or origin. It may relate to vegetable oils or fats, animal oils or fats, fish oils, microbial oils or algae oils, preferably edible oils. They may be derived, for example, from one or more vegetable and/or animal sources and may include oils and/or fats from a single origin or blends of two or more oils and/or fats from different sources or with different characteristics. They may be derived from standard oils or from specialty oils such as low 3-MCPD oils, low GE-oils (GE=glycidyl esters), from modified or unmodified oils and/or fats (i.e. from oils in their natural state or oils that have been subjected to a chemical or enzymatic modification, to a hydrogenation, or to fractionation) and so on. Preferably, they will be derived from vegetable oils or vegetable oil blends. Examples of suitable vegetable oils include: soybean oil, corn oil, cottonseed oil, linseed oil, olive oil, palm oil, palm kernel oil, coconut oil, peanut oil, rapeseed oil, safflower oil, sunflower oil, sesame seed oil, rice bran oil, canola oil babassu oil, cohune oil, tacum oil, cuphea oil, and any fractions or derivatives thereof. According to a particularly aspect of the invention, the refined oils of the present invention will be derived from palm oil. Palm oil is encompassing palm oil, as well as palm oil fractions such as stearin and olein fractions (single as well as double fractionated, and palm mid fractions) and blends of palm oil and/or its fractions.

Furthermore, the edible oil, preferably the vegetable oil is a crude oil, bleached oil, an RBD-oil, an NBD oil, a refined-bleached-deodorized-re-bleached oil, as such referring to the refining process applied to the oils before entering the equipment of the present invention. RBD stands for refined bleached and deodorized oil and corresponds to a typical physically refined oil. NBD stands for neutralized bleached deodorized oil and corresponds to a chemically refined oil. Preferably the quality of the oil is such that the content of free fatty acids is not too high. Preferably the quality of the oil entering the process in step a) is such that the content of free fatty acids is not more than 0.2%, not more than 0.15%, preferably not more than 0.1%, more preferably not more than 0.07%, not more than 0.06% (measured according to AOCS method Ca 5a-40).

It further relates to the use of oil refining equipment of the present invention for degrading, decomposing or breaking down oxidation products of triglycerides, diglycerides, monoglycerides and/or fatty acids.

In fact, the primary oxidation products are decomposed and/or converted into secondary oxidation products and the secondary oxidation products are removed from the oils or fats by vaporization and/or stripping, preferably from edible oils and fats. It further relates to the use wherein the peroxide values of the edible oils or fats are reduced.

The primary oxidation products encompass the hydroperoxides. The secondary oxidation products are the ketones and the aldehydes of the corresponding hydroperoxides and fatty acids.

The use of the present invention allows obtaining an oxidative stable oil with peroxide value<0.1 meq/kg and bland taste, and required Oxidation Stability Index (OSI). And this is even achieved without removing heavier volatile compounds.

It further relates to the use of the oil refining equipment of the present invention as a continuous flow reactor. More in particular, the stripping column of the refining equipment is used as continuous flow reactor.

The continuous flow reactor resembles a plug flow reactor, whereby a plug flow reactor model is used to describe chemical reactions in continuous, flowing systems of cylindrical geometry and just provides suitable contact time.

Furthermore, the use of the present invention allows obtaining the oil with minimal losses of desired constituents. The use of the refining equipment of the present invention allows to obtain good to excellent quality of the oil in respect of nutrition quality, and chemical quality.

Undesired contaminants are not present, and the desired constituents are maintained to the largest extend possible.

The current invention relates to the use of the current refining equipment operated at a temperature of from 170 to 220° C., from 180 to 220° C., from 190 to 210° C., from 195 to 200° C., from 198 to 215° C.

Surprisingly, it is shown that by applying the refined equipment of the present invention, the decomposition, degradation or breakdown of oxidation products is occurring in the stripping column of the refining equipment at a much faster rate and at significant lower temperatures in comparison with standard continuous (or batch, or semi-continuous), deodorizers with retention trays. Typically, the use of the claimed refining equipment allows to obtain the required oil quality with respect to oxidation stability, odour and taste at a temperature of maximum of 220° C., maximum of 215° C., and in a much shorter retention time in the stripping packing, e.g. maximum of 8 minutes, while a standard continuous deodorizer is operating at higher temperatures and is requiring more than double of this retention time.

The use of the present invention relates to the reduction of the peroxide values of the vegetable oils or fats. This reduction is significant. Peroxide value (=PV) of 0.30 to 10 meq/kg, from 0.30 to 7 meq/kg, from 0.30 to 5 meq/kg is reduced with at least 40%, at least 50%, at least 60%, at least 70%, at least 80%, at least 85%, at least 90%, at least 95%, at least 99%. The peroxide value is reduced to a peroxide value below 0.7 meq/kg, below 0.5 meq/kg, 0.4 meq/kg, 0.3 meq/kg 0.2 meq/kg, below 0.1 meq/kg, below 0.075 meq/kg.

It further relates to a process for deodorizing an edible oil in the oil refining equipment of the present invention and the process is comprising the following steps:
a) Passing an edible oil through the stripping column of refining equipment of the present invention at a temperature of from 170 to 220° C., from 180 to 220° C., from 190 to 210° C., from 195 to 200° C., from 198 to 215° C.,
b) Applying stripping agent to the flow of the oil, and contacting the oil with the stripping agent,
c) Removing volatiles from the oil,
d) Collecting the deodorized oil.

In a further aspect of the invention, the current process comprises a pre-heating step prior to step a).

The stripping agent is applied co-current or counter-current to the flow of the oil. Preferably the stripping agent is applied counter-current to the flow of the oil.

The residence time, more in particular the residence time in the stripping packing is from 1 to 10 minutes, from 1 to 9 minutes, from 2 to 8 minutes, from 3 to 7 minutes, from 4 to 6 minutes, from 5 to 5 minutes, from 1 to 3 minutes.

Deodorization is a commonly known process. It involves the stripping of volatile components, the removal of off-flavors and the thermal degradation of unwanted components and typically the retention time is more than 20 minutes, usually between 20 and 60 minutes, even up to several hours.

Typically deodorization is occurring in a deodorizer whereby the deodorizer may have several configurations, such as horizontal vessels, vertical tray-type deodorizers and combined with packed columns.

It has been found that in the current invention the edible oils or fats can be deodorized at low temperature and with a short residence time in comparison to residence time in standard deodorizers. It has been found that in the process of the present invention, the primary oxidation products are decomposed and the formed secondary oxidation products are removed as volatiles at low deodorization temperature and with short residence times. The collected deodorized oil is good to excellent in quality, in particular in respect of parameters such as high oxidative stability, color, neutral in odor and taste.

The process of the current invention allows to reduce the peroxide values significantly, e.g. with at least 40%, at least 50%, at least 60%, at least 70%, at least 80%, at least 85%, at least 90%, at least 95%, at least 99%. Furthermore, by working at low temperature and with short residence time it was found that the risk to form unwanted contaminants, such as chloropropanol fatty acid esters, free epoxypropanols, epoxypropanol (=glycidol esters, GE) fatty acid esters, and combinations thereof, has been significantly reduced.

In one aspect of the process of the invention wherein the stripping agent applied counter-current to the flow of the oil, the stripping agent is introduced at the bottom or near the bottom of the stripping column. Furthermore, the stripping agent is steam or any other stripping agent such as nitrogen gas. Preferably steam is used as stripping agent.

The applied absolute pressure in the equipment is from 0.5 to 10 mbar, from 1 to 9 mbar, 2 to 8 mbar, 3 to 8 mbar, 5 to 8 mbar.

The temperature is from 170 to 220° C., from 180 to 220° C., from 190 to 210° C., from 195 to 200° C., from 198 to 215° C.

Furthermore, in the process of the invention the retention time more in particular a residence time in the stripping packing of from 1 to 10 minutes, from 1 to 9 minutes, from 2 to 8 minutes, from 3 to 7 minutes, from 4 to 6 minutes, from 1 to 5 minutes, from 1 to 3 minutes.

The current invention is illustrated by the following non-limiting examples.

METHODS

Stripping Column—The stripping column consists of a structured packed bed which can accommodate different types of packing and heights. Oil is heated up in an in-line electric heater and sprayed onto the packing bed at the top of the stripping column to guarantee good oil distribution and intimate contact with the stripping agent. Stripping steam is introduced at the bottom of the stripping column, counter current to the flow of the oil. Designed by Cargill and manufactured by VGM (The Netherlands). Shape: vertical cylindrical. Structured packing: Raschig Super-pak RSP 250X; specific surface area 250 $m^2/m^3$, diameter: 255 mm; max height: 708 mm. The height to diameter ratio is 2.8. Capacity (oil process) (flow rate): 15-25 kg/h. Material of construction: Stainless steel. Sight glass near the oil distribution nozzle. An outlet vessel with a cooling jacket is located at the bottom of the stripping column.

The peroxide value is measured according to the AOCS Method Cd 8b-90.

Glycidyl ester was determined using Method DGF Standard Methods Section C (Fats) C-VI 18(10).

Glycidyl ester content can be calculated as the result of DGF Standard Methods Section C (Fats) C-VI 18(10) Option A, measuring the combined content of 3-MCPD esters and glycidyl esters, minus the result of DGF Standard Methods Section C (Fats) C-VI 18(10) Option B, measuring 3-MCPD ester content alone.

Example 1

RBD Palm oil with peroxide level 1.94 meq/kg was fed to the stripping column at a flow rate of 22.4 kg/h, oil loading 2.5 kg/$m^2$ h surface of packing, resulting in a residence time of 3.2 min.

The temperature was 178° C. and the vacuum in the stripping column was maintained constant at about 2.2 mbar. Stripping steam (0.3 wt % relative to the oil flow) was used in counter-current mode to facilitate removal of volatile compounds.

The collected palm oil had a peroxide value of 0.31 meq/kg.

GE of palm oil before and after treatment were below LOQ.

Example 2

RBD Rapeseed oil with a peroxide value of 4.54 meq/kg was fed to the stripping column at a flow rate of 22.4 kg/h, oil loading 2.5 kg/$m^2$ h surface of packing resulting in a residence time of 3.2 min.

The temperature was 193° C. The vacuum in the stripping column was maintained constant at about 2.5 mbar. Stripping steam (0.3 wt % relative to the oil flow) was used in counter-current mode to facilitate removal of volatile compounds.

After this treatment in the stripping column the peroxide level was reduced to 0.34 meq/kg.

Example 3A

Crude algae oil (43 Kg) was transferred from the drum into the refining vessel and was heated up to 80° C. About 0.5 L of heated crude algae oil was removed from the refining vessel into a 1 L flask under nitrogen, and 1.0 wt % silica (JKC-5) and 0.03 wt % cellulose (Filtracel Active 112) relative to the initial crude oil mass was added to the flask. Nitrogen was bubbled through the oil in the flask to minimize contact of air with the oil. Demineralized water (0.4 wt % relative to the initial crude the oil mass) was added to the slurry in the flask. The slurry was then emptied into the refining vessel under nitrogen. The contents in the refining vessel were stirred at 270 rpm for 20 min at atmospheric pressure, and then for 5 min at <2 mbar. The oil containing silica and cellulose was circulated through the filtration loop until it was observed to be clear through the sight glass. It was then passed through the polishing filter and transferred to a storage vessel, which was used as the feed tank for the stripping column. The oil in the deodorizer vessel was maintained at 40° C. with a slight nitrogen pressure.

The filtered oil from the storage vessel was fed at a flow rate of 20 kg/h to the stripping column. An inline electric heater at the stripper inlet nozzle heated the oil to a temperature of 190° C. The vacuum in the stripping column was maintained constant at ~2.0 mbar. Stripping steam (2.0 wt % relative to the oil flow) was used in a counter-current mode to facilitate removal of volatile compounds. The oil loading was 2.2 kg/$m^2$ h, and retention time was 3.5 minutes. Oil samples for analysis were collected only when a steady state was reached, as observed by a constant flow and temperature. The stripped oil was collected in a collection vessel that was cooled to ~50° C. and sampled out through a polishing filter. The sample collected is 3A.

Example 3B

Crude algal oil (40 Kg) was transferred from the drum into the Refining vessel and heated up to 80° C. An oil/cellulose slurry was prepared in a 5 L plastic bucket as previously described, using 2 L crude hot algae oil and 2.0 wt % cellulose (Filtracel Active 112) relative to the initial crude oil. Nitrogen was sparged through the oil in the plastic bucket to minimize contact with air. After transferring this slurry to the refining vessel, the mixture in the refining vessel was stirred at 270 rpm for 5 min, and then reduced to 30-60 rpm before commencing filtration. The cellulose-treated oil was filtered through the candle filter, and then through the polishing filter, before being transferred to the batch deodorizer.

The cellulose-treated oil was heated in the deodorizer to 150° C., under a reduced pressure of 3.2-3.5 mbar. Sparge steam was started when the oil reached 100° C. A maximum of 1.0 wt % sparge steam relative to the oil mass was used. After 1 hour the oil was cooled down to 100° C. before being fed to the stripping column, while a nitrogen overpressure of ~1.1 bar-a was maintained in the deodorizer. The oil from the deodorizer was fed to the stripping column at the rate of 20 kg/hr. The stripping column was operated at a reduced pressure of ~2.0 mbar. An inline heater at the stripping column inlet nozzle was used to heat up the oil entering the stripping column to 190° C. Stripping steam (2.0 wt % relative to the oil flow rate) was supplied counter current to the flow of the oil. The oil loading was 2.2 kg/$m^2$ h, and retention time was 3.5 minutes. When the process reached a steady state, indicated by a stable flow rate and temperature, the oil exiting the stripping column was cooled to <60° C. and collected. The temperature setting for the stripping column inlet nozzle was then changed to 200° C., and once again samples collected once the process reached a steady state. The collected samples are labelled 3B(i) (190° C.) and 3B(ii) (200° C.).

Example 3C

Crude algal oil (40 kg) was transferred from the drum into the refining vessel. The oil was heated up to 120° C. Two liters of the hot oil was transferred to a 5 L plastic bucket under an atmosphere of nitrogen and 0.5 wt % silica (JKC-7)

and 1.0 wt % cellulose (Filtracel Active 112), both relative to the initial crude oil, were added to the oil in the plastic bucket while sparging nitrogen through the oil. The contents were swirled until the mixture became homogeneous. The slurry was then poured into the refining vessel under nitrogen. The contents in the refining vessel were stirred at 270 rpm for 30 min at atmospheric pressure, and then for 5 min at <2 mbar.

The contents in the refining vessel were subjected to filtration using the candle filter, and then transferred to the deodorizer after passing through the polishing filter. The filtered oil in the deodorizer was heated to 100° C. under reduced pressure (~3.3 mbar) for 30 minutes, during which sparge steam (1.5 wt % based on the oil mass in the deodorizer) was provided. The oil from the deodorizer was then sent to the counter current stripping column. The inline heater at the stripping column inlet nozzle heated the oil entering the stripping column to 190° C. The oil was supplied at a flow rate of 15 kg/hr. A reduced pressure of ~2.0 mbar was maintained in the stripping column. Stripping steam (2.0 wt % relative to the oil flow rate) was provided counter-current to the flow of the oil. The oil loading was 1.6 kg/m² h, and retention time was 4.7 minutes. Once a steady state was reached, as indicated by a constant flow and temperature, samples were collected for analysis through the polishing filter. Cooling water was supplied to the collection vessel attached to the bottom of the stripping column, so sampling could be done at <60° C. The inlet heater at the stripping column nozzle was then set to a temperature of 200° C., and samples collected again after the system reached a steady state. The samples collected were 3C(i) (190° C.) and 3C(ii) (200° C.).

TABLE 1

| Sample # | t-2-P (ppb) | Hexanal (ppb) | DMDS (ppb) | 2-MCP (ppb) | Total Carotenoid Content mg/kg | Initial PV (meq/kg) | Final PV (meq/kg) |
|---|---|---|---|---|---|---|---|
| Crude oil | 330.99 | 148.91 | 2323.94 | 3856.88 | 107 | | |
| 3A | ND | <2.5/<LOQ | ND | ND | 83 | 1.64 | 0.06 |
| 3B(i) | ND | <2.5/<LOQ | ND | ND | 86 | 0.22 | 0.04 |
| 3B(ii) | ND | <2.5/<LOQ | ND | ND | 79 | 0.22 | 0.06 |
| 3C(i) | ND | <2.5/<LOQ | ND | ND | 76 | 0.70 | 0.10 |
| 3C(ii) | ND | <2.5/<LOQ | ND | ND | 73 | 0.70 | 0.26 |

All samples have a DHA content of between 42.5% and 44.5%.

It is clear from Table 1 that the mild deodorization of the process described above has a dramatic effect on the level of impurities, reducing them below the limit of detection (ND) or quantification (LOQ). At the same time, however, the level of carotenoids is substantially preserved with a retention of 68.2% and 86.9% allowing the oils to maintain their colored appearance. In contrast the crude oil contains high levels of impurities and the conventionally refined bleached and deodorized oil has very little or no retained carotenoids.

The invention claimed is:

1. An oil refining equipment comprising a stripping column with packing wherein
   a) the packing is having a specific surface of from 100 to 750 m²/m³,
   b) the column has at least one entry for a stripping agent, and/or for the oil, and
   c) the column has a height to diameter ratio from 0.1 to 10.

2. The refining equipment according to claim 1 wherein the column has an oil loading of from 0.5 to 3.5 kg/m²h surface of packing.

3. The refining equipment according to claim 1 wherein the packing allows for a residence time of from 1 to 10 minutes.

4. The refining equipment according to claim 1 wherein the stripping column is operated at a temperature of from 170 to 220° C.

5. The refining equipment according to claim 1 wherein the equipment is further comprising not more than one oil collection tray.

6. The refining equipment according to claim 1 wherein the equipment is operated at an absolute pressure of from 0.5 to 10 mbar.

7. A method for using the oil refining equipment according to claim 1 for degrading, decomposing or breaking down oxidation products of triglycerides, diglycerides, monoglycerides and/or fatty acids.

8. The method according to claim 7 wherein the equipment is used as a continuous flow reactor.

9. The method according to claim 7 wherein the peroxide values of the edible oils or fats are reduced.

10. A process for deodorizing an oil in an oil refining equipment according to claim 1 and the process is comprising the following steps:
    a) passing an edible oil through the stripping column of the refining equipment according to claim 1, at a temperature of from 170 to 220° C., and at an absolute pressure of 0.5 to 10 mbar,
    b) applying stripping agent to the flow of the oil, and contacting the oil with the stripping agent,
    c) removing volatiles from the oil, and
    d) collecting the deodorized oil.

11. The process according to claim 10 wherein the stripping agent is introduced counter current to the flow of the oil.

12. The process according to claim 10 wherein the stripping agent comprises an agent selected from steam or nitrogen gas.

13. The process according to claim 10 wherein the oil before passing through the stripping column has a peroxide value of from 0.30 to 10 meq/kg, which peroxide value is reduced at least 40% as measured after collection of the deodorized oil.

14. The process according to claim 10 wherein the peroxide value is reduced to a peroxide value below 0.7 meq/kg.

15. The refining equipment according to claim 1 wherein the packing has a specific surface of from 100 to 500 m²/m³.

16. The refining equipment according to claim 1 wherein the packing has a specific surface of from 150 to 250 m²/m³.

* * * * *